(12) United States Patent
Weihrauch et al.

(10) Patent No.: US 7,612,481 B2
(45) Date of Patent: *Nov. 3, 2009

(54) ROTOR WITH A COVER PLATE FOR SECURING A MAGNET IN THE ROTOR

(75) Inventors: Niels Christian Weihrauch, Flensburg (DE); Peter Scavenius Andersen, Soenderborg (DK)

(73) Assignee: Danfoss Compressors GmbH, Flensburg (DE)

( * ) Notice: Subject to any disclaimer, the term of this patent is extended or adjusted under 35 U.S.C. 154(b) by 303 days.

This patent is subject to a terminal disclaimer.

(21) Appl. No.: 11/312,957

(22) Filed: Dec. 19, 2005

(65) Prior Publication Data

US 2006/0158056 A1    Jul. 20, 2006

(30) Foreign Application Priority Data

Dec. 20, 2004 (DK) ................ 2004 01958

(51) Int. Cl.
*H02K 21/12* (2006.01)

(52) U.S. Cl. .................... 310/156.78; 310/156.53; 310/156.54; 310/156.56

(58) Field of Classification Search ......... 310/210–212, 310/156.74–156.78, 156.81, 156.53, 56–57
See application file for complete search history.

(56) References Cited

U.S. PATENT DOCUMENTS

| | | | | |
|---|---|---|---|---|
| 1,823,337 | A * | 9/1931 | Sheely | 310/212 |
| 4,064,410 | A * | 12/1977 | Roach | 310/211 |
| 4,639,627 | A | 1/1987 | Takekoshi et al. | |
| 5,140,211 | A * | 8/1992 | Ucida | 310/156.61 |
| 5,185,918 | A * | 2/1993 | Shafer, Jr. | 29/598 |
| 5,369,325 | A * | 11/1994 | Nagate et al. | 310/156.64 |
| 5,719,457 | A * | 2/1998 | Helfer | 310/211 |
| 5,864,191 | A * | 1/1999 | Nagate et al. | 310/156.54 |
| 6,006,418 | A | 12/1999 | Takeda et al. | |
| 6,031,312 | A * | 2/2000 | Zoche et al. | 310/211 |
| 6,047,460 | A * | 4/2000 | Nagate et al. | 29/598 |
| 6,552,462 | B2 | 4/2003 | Sakai et al. | |
| 6,700,270 | B2 | 3/2004 | Yanashima et al. | |
| 6,707,216 | B2 | 3/2004 | Han et al. | |
| 6,727,627 | B1 * | 4/2004 | Sasaki et al. | 310/211 |
| 6,727,628 | B2 * | 4/2004 | Shimada et al. | 310/216 |

(Continued)

FOREIGN PATENT DOCUMENTS

DE    10254967    6/2004

(Continued)

*Primary Examiner*—Quyen Leung
*Assistant Examiner*—Naishadh N Desai
(74) *Attorney, Agent, or Firm*—McCormick, Paulding & Huber LLP

(57) ABSTRACT

The invention provides a rotor for an electrical motor, e.g. a line-start motor. The rotor comprises a magnet located in a cavity in a rotor core. The core is laminated from sheets of magnetically conductive material and the magnet is secured in the cavity by an end plate which covers the end face. To avoid short circuiting of the magnet, an aperture is provided in the end plate such that a first portion of the opening into the cavity is in communication with the aperture and such that a remaining, second, portion of the cavity is covered by the end plate to secure the magnet in the cavity independently upon the orientation of the end plate around the center axis.

13 Claims, 3 Drawing Sheets

U.S. PATENT DOCUMENTS

| | | |
|---|---|---|
| 6,876,119 B2 | 4/2005 | Sasaki et al. |
| 6,891,300 B2 | 5/2005 | Noda et al. |
| 6,933,647 B2 | 8/2005 | Kuemmlee et al. |
| 7,019,427 B2 | 3/2006 | Sasaki et al. |
| 7,112,908 B2 | 9/2006 | Takita et al. |
| 7,183,686 B2 * | 2/2007 | Sasaki et al. ........... 310/156.78 |
| 7,365,466 B2 * | 4/2008 | Weihrauch et al. ..... 310/156.78 |
| 2004/0004407 A1 | 1/2004 | Laurent et al. |
| 2005/0121991 A1 | 6/2005 | Sasaki et al. |
| 2006/0119205 A1 | 6/2006 | Sasaki et al. |
| 2006/0131977 A1 | 6/2006 | Weihrauch et al. |
| 2006/0131980 A1 | 6/2006 | Weihrauch et al. |

FOREIGN PATENT DOCUMENTS

| | | | |
|---|---|---|---|
| JP | 3-124238 | | 5/1991 |
| JP | 9233750 | | 9/1997 |
| JP | 9308195 | | 11/1997 |
| JP | 11-355985 | | 12/1999 |
| JP | 2000004550 | | 1/2000 |
| JP | 2000232760 | | 8/2000 |
| JP | 2001-268829 | | 9/2001 |
| JP | 2001-346368 | | 12/2001 |
| JP | 2003-102151 | | 4/2003 |
| JP | 2003102151 A | * | 4/2003 |
| JP | 2003-209941 | | 7/2003 |
| JP | 2003235189 | | 8/2003 |
| JP | 2004129369 | | 4/2004 |
| JP | 2004364349 | | 12/2004 |
| JP | 2004364349 A | * | 12/2004 |

* cited by examiner

ROTOR WITH A COVER PLATE FOR SECURING A MAGNET IN THE ROTOR

CROSS-REFERENCE TO RELATED APPLICATIONS

Applicant hereby claims foreign priority benefits under U.S.C. § 119 from Danish Patent Application No. PA 2004 01958 filed on Dec. 20, 2004, the contents of which are incorporated by reference herein.

FIELD OF THE INVENTION

The invention relates to a rotor for an electrical motor e.g. a line start motor. In particular, the invention relates to a rotor comprising a rotor core made from a magnetically conductive material. The rotor comprises a squirrel cage in which an electrical current can be induced during operation of the motor. The rotor further comprises at least one permanent magnet, and it could therefore be applied in a line-start motor. The magnet is located in a cavity with a first cross-sectional area, the cavity forming an opening in an end face of the core. The opening enables insertion of the magnet into the cavity after the squirrel cage has been moulded. An end plate is attached to the end face to secure the magnet in the cavity. To reduce, or to avoid short circuiting of the magnet, the end plate comprises an aperture with a second cross-sectional area.

BACKGROUND OF THE INVENTION

In one type of commonly used electrical motors, a stator comprises windings in which an electrical field creates a rotating magnetic field. Inside, or circumferentially outside the stator, a rotor is rotationally attached to rotate under influence of the magnetic field. Various principles exist. In a synchronous motor, the rotor is magnetised, or comprises a set of permanent magnets. This type of motor is simple and reliable, and the rotational speed of the rotor corresponds to the rotational speed of the electrical field in the windings of the stator. In certain applications, however, the synchronous motor has an inappropriate start-up characteristic. In asynchronous motors, the rotor comprises substantially longitudinally extending windings which in axially opposite ends of the rotor are interconnected by short circuit rings. Typically, a rotor for an asynchronous motor comprises a rotor core made from a magnetically conductive material and a squirrel cage wherein the windings and short circuit rings are moulded in one piece from an electrically conductive material, e.g. aluminium. The rotor could be laminated from sheets of a metal, wherein each sheet comprises an opening which, in combination with other sheets, forms a conductor slot extending axially throughout the rotor. After the assembly of the sheets into a rotor core, conductive bars, constituting the windings, are moulded directly into the conductor slots using the slots as a mould, and the short circuit rings are moulded as an integral part of the bars. In use, an electrical current is induced into the windings of the rotor by the magnetic field generated in the stator, and due to a shift between the electrical field in the windings of the stator and in the windings of the rotor, the rotor starts to rotate. Such motors have good start-up characteristics but in order to continue the induction of an electrical field into the windings of the rotor, the electrical field of the stator must move relative to the windings of the rotor. The rotational speed of the rotor will therefore always be lower than the rotational speed of the electrical field in the stator. To increase the speed of the rotor, a rotor for a line-start motor comprises, in addition to the windings, a set of permanent magnets, and a line-start motor thereby combines the advantages of synchronous and asynchronous motors.

Since large temperatures during the moulding of the squirrel cage may influence the strength of the permanent magnets or even destroy the magnets, the magnets are normally inserted into the cavities after the squirrel cage has been moulded. In one known motor of this kind, the magnet cavities are formed by openings, typically quadrangular openings, extending through the rotor from one axial end face to the opposite axial end face. In one of the end faces, the opening is closed, or the opening area is reduced by a first end plate having either no opening or an opening of a reduced size. The end plate forms part of the rotor stack and it is typically made from the same material, i.e. a magnetically conductive material. In an opposite end, the magnets are inserted into the cavities, and a second end plate is subsequently fitted to the opposite end face to secure the magnets. Analogously to the first end plate, the second end plate of the known motors has either no openings, or openings of a reduced size.

BRIEF SUMMARY OF THE INVENTION

It is an object of the invention to provide an alternative rotor and to improve the existing motors. It is a further object to provide a method of securing the magnets in a rotor, e.g. for a line-start motor. Accordingly the invention provides a rotor of the kind mentioned in the introduction wherein the aperture is provided such that a first portion of the opening into the cavity is in communication with the aperture and such that a remaining, second, portion of the cavity is covered by the end plate to secure the magnet in the cavity independently upon the orientation of the end plate around the centre axis. Since the magnets are secured independently upon the orientation of the end plate, indexation of the end plate is unnecessary and the manufacturing process has been facilitated.

In one embodiment, the second area is at least as large as the first area and the aperture is shaped or offset from the cavity such that a major portion of the opening into the cavity is in communication with the aperture and such that a remaining portion of the cavity is covered by the end plate to secure the magnet in the cavity. Since the aperture is at least of the size of the cross-section of the cavity, short circuiting of the magnet can be prevented or reduced when compared with end plates of the known kind.

The core could be made from plates of a magnetically conductive material, e.g. an iron containing material. The plates could be made and assembled in an interlocking process. The magnet cavity could be formed by holes in each of the plates. When the plates are stacked, the holes form substantially axially extending conductor slots in the stacked rotor structure, in which slots the windings of the squirrel cage can be moulded. The cavity could have a shape which exactly matches the shape of the magnet to narrowly enclose the magnet. Preferably, the magnet and the cavity have rectangular cross sectional shapes, and preferably the cavities extend through the rotor core from a first axial end face to an opposite second axial end face with a uniform cross-sectional size and shape. An end plate of a first type could be made and attached to the first axial end face of the core during the interlocking process, and subsequently, the squirrel cage could be moulded directly into the slots for the conductors in the core thereby leaving an opening in the second axial end face for insertion of the magnets into the magnet cavity after the moulding of the squirrel cage. In that way, the magnets can be protected from the high temperatures generated in the moulding process. Finally, an end plate of a second type may be attached to the second axial face for securing the magnets in the magnet cavities. The end plates of the first and/or the second type is preferably made from a magnetically conductive material, and preferably from the same material as the plates constituting the rotor core. The end plates are provided with apertures with a cross-section at least of the size, or larger than the cross-section of the cavity, or at least of the size, or larger than the cross-section of the opening in the end face into the cavity. The shape of the apertures may, however, be different from the shape of the opening in the end face, or the aperture may be offset with respect to its position over the opening such that a major portion of the opening into the cavity is in communication with the aperture and such that a remaining, minor, portion of the cavity is covered by the end plate to secure the magnet in the cavity. A major portion could be more than 50 pct. such as more than 75 pct. or even such as more than 95 pct. or more than 99 pct. of the cross-sectional area of the aperture is in communication with the opening into the cavity. Preferably, the rotor comprises a plurality of magnets, e.g. arranged symmetrically around a radially extending axis of symmetry, e.g. the axis of rotations of the rotor in the motor.

In one embodiment, the aperture is arched, or forms part of a circle extending symmetrically around the centre axis. As an example, a circular aperture could be split into a number of segments separated by bridging portions. In this embodiment, one of the magnets could be secured in the cavity by the inner peripheral edge, and an adjacent magnet could be secured in the cavity by the outer peripheral edge.

To enable repeated attachment and detachment of the end plate to the rotor core, the end plate may have a peripheral rim with a first rim portion and a second rim portion forming different radial distances to the centre axis. In that way, the end plate could be attached to the end face of the rotor core, e.g. by riveting along the edge, and if the end plate has to be removed, e.g. for replacement of the magnets, the end plate could rotated so that the already existing riveting points does not interfere with the rim portion with the largest radial size of the end plate.

In a second aspect, the invention provides a method of making a rotor comprising:
  a core made of a magnetically conductive material,
  a magnet located in a cavity in the core, the cavity having a first cross-sectional area and allowing insertion of the magnet into the cavity via an opening in an end face of the core, and
  an end plate which partially covers the end face, the end plate having an aperture with a second cross-sectional area being at least the size of the first cross-sectional area.

the method being characterised in that the end plate is attached to the core with the aperture being offset from the cavity such that a major portion of the opening into the cavity is in communication with the aperture and such that a remaining, minor, portion of the cavity is covered by the end plate to secure the magnet in the cavity. The end plate could e.g. be attached by riveting or by gluing. Any method steps necessary to derive at the structure according to the first aspect of the invention may apply.

BRIEF DESCRIPTION OF THE DRAWINGS

In the following, a preferred embodiment of the invention will be described in further details with reference to the drawing in which.

DETAILED DESCRIPTION OF THE INVENTION

Figure 1:
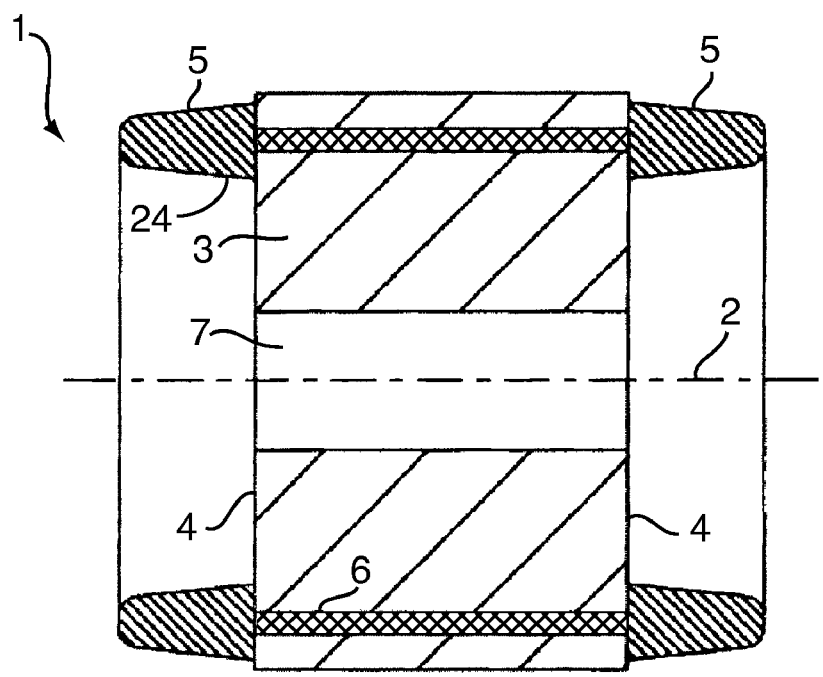
FIG. 1 shows a rotor according to the invention.

FIG. 1 shows a rotor 1 which is carried in a stator for rotation around the centre axis 2. The rotor comprises a rotor core 3 with first and second axially opposite end-faces 4. The rotor further comprises first and second axially opposite short circuit rings 5 which join the axially extending windings 6. Each short circuit ring 5 has an inner surface 24. The rotor is assembled with a drive shaft (not shown) which extends through the opening 7 and which is suspended in rotational bearings to enable rotation of the rotor relative to a corresponding stator (not shown). The rotor is made from sheets of a metal which is stacked to form a laminated core. Each sheet comprises an opening which, in combination with other sheets, forms conductor slots extending axially throughout the rotor. After the assembly of the sheets into a rotor core, conductive bars, constituting the windings, are moulded directly into the conductor slots using the slots as a mould, and the short circuit rings are moulded as an integral part of the bars. To increase the speed of the rotor, a rotor comprises 6 permanent magnets, i.e. the rotor is for a line-start motor.

Figure 2:
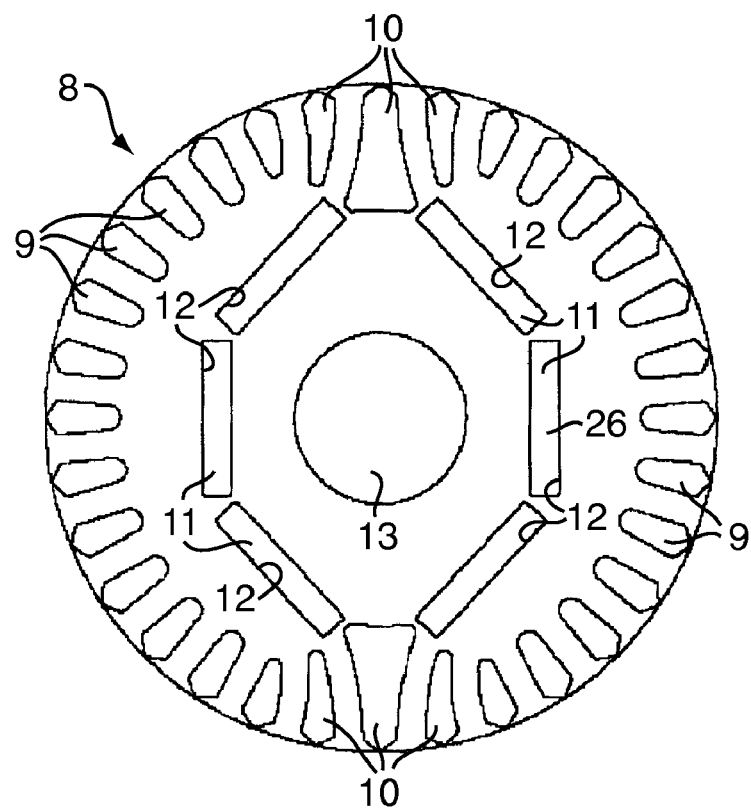
FIG. 2 shows a view of a plate for a rotor stack.

FIG. 2 shows a top view of one type of the metal sheets 8 in the rotor stack in which the openings 9 form part of the conductor slots when a plurality of sheets are stacked to form the laminated rotor structure. At two radially opposite locations, the conductor slots 10 are longer and wider to form a barrier for the magnetic flux. Each metal sheet 8 has rectangular openings 11, wherein each opening 11 defines a first cross-sectional area 26. In the assembled state, the rectangular openings 11 form magnet cavities for permanent magnets 12 which are inserted into openings in one of the two axially opposite end-faces of the rotor to form a line start motor. The centre-opening 13 forms part of the axially extending opening through the rotor for the drive shaft.

Figure 3:
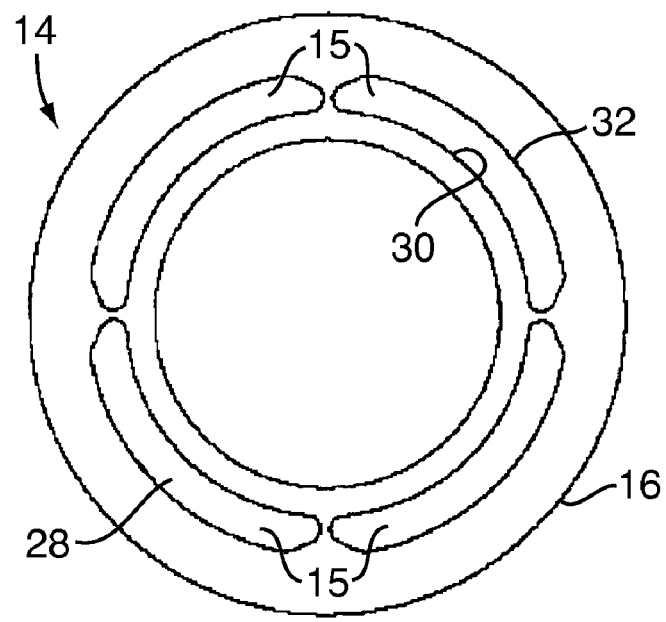
FIGS. 3-5 show different embodiments of end plates for securing the magnets in the rotor stack.
Figure 4:
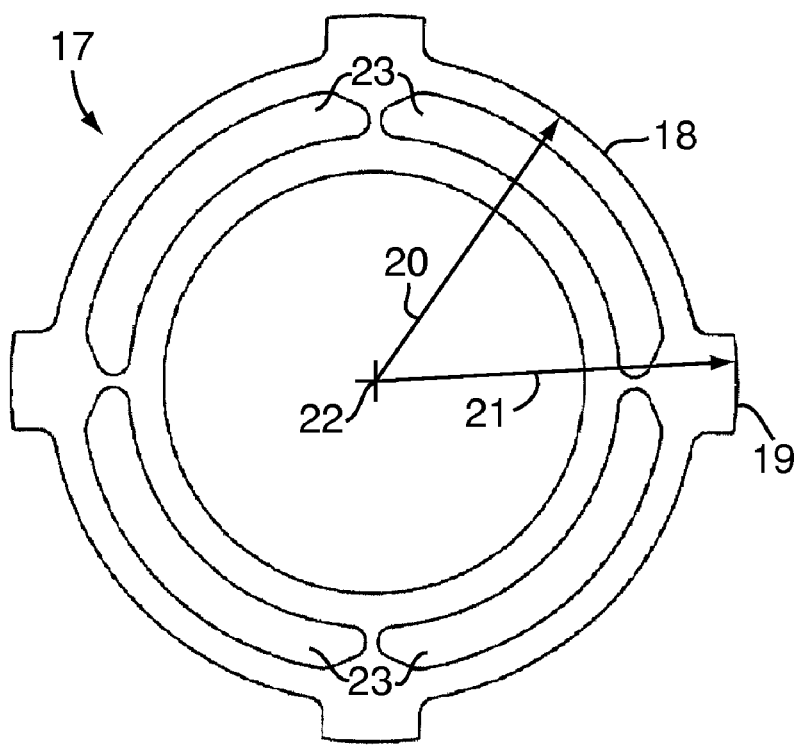
Figure 5:
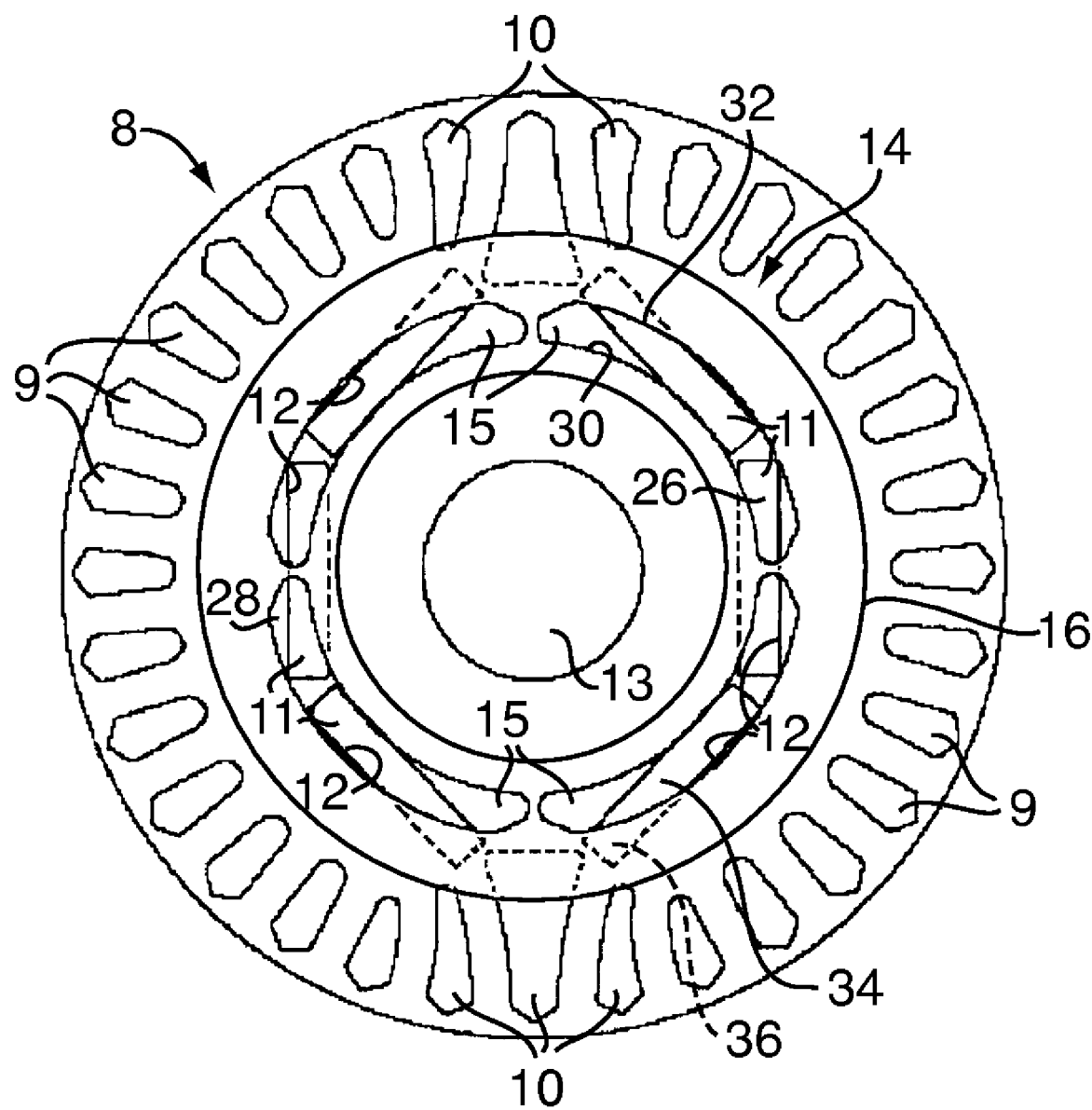

The end plate 14 in FIG. 3 is adapted to be fitted to an end face of the core after the squirrel cage has been moulded. For that purpose, the end plate has a smaller radial size than the sheets of metal constituting the rotor core, and it does not have any of the openings 9 forming part of the conductor slots. During the manufacturing process, the rotor core is made in an interlocking process wherein a number of plates 8 are stacked to form the main part of the rotor core. In one end, the cavities for the magnets are at least partly closed, e.g. by use of an end plate which forms part of the rotor stack and which comprises conductor openings through which the conductor bars may extend. After the moulding process, i.e. when the work piece has cooled down, the magnets are inserted into the magnet cavities through on opposite end face, and an end plate e.g. of the kind shown in FIGS. 3 and 4 is fitted to that end face to secure the magnets in the cavities. The end plate could be joined with the remaining part of the rotor stack e.g. by use of rivets, or the end plate could be glued onto the rotor stack. To fit within an inner peripheral wall of the short circuit ring, the end plate has a circular outer peripheral rim 16. The end plate 14 has a plurality of apertures 15, wherein each aperture 15 defines a second cross-sectional area 28. Each aperture 15 includes an arched radial inner peripheral edge 30 and an arched radial outer peripheral edge 32, such that each aperture 15 is arch shaped. Referring to FIG. 5, due to the circular shape of the apertures 15 and the circular shape of the outer peripheral rim, the end plate 14 can be located arbitrarily on the end face of the core within the short circuit ring to secure the magnets in the cavities. Even when the end plate 14 is arbitrarily located on the end face of the core, a first portion 34 of the rectangular opening 11 of the magnet cavity is in communication with the aperture 15, and a remaining second portion 36 of the rectangular opening 11 of the magnet cavity is covered by the end plate 14 to secure the magnet 12 in the cavity formed by openings 11. This allows each magnet 12 to be secured in a magnet cavity independently of the orientation of the end plate 14. FIG. 4 shows an end plate 17 with a peripheral rim with a first rim portion 18 and a second rim portion 19 forming different radial distances indicated by numerals 20 and 21 to the centre axis 22.

Corresponding to the end plate in FIG. 3, the end plate 17 has apertures 23 which can be located in communication with the openings into the cavities for The magnets.

While the present invention has been illustrated and described with respect to a particular embodiment thereof, it should be appreciated by those of ordinary skill in the art that various modifications to this invention may be made without departing from the spirit and scope of the present invention.

What is claimed is:

1. A rotor for rotation about a centre axis in an electrical motor, the rotor comprising:
   a core made of a magnetically conductive material,
   a magnet located in a cavity in the core, the cavity having a first cross-sectional area and allows insertion of the magnet into the cavity via an opening in an end face of the core, and
   an end plate which covers the end face, the end plate having an aperture with a second cross-sectional area,
   wherein aperture is provided such that a first portion of the opening into the cavity is in communication with the aperture and such that a remaining, second, portion of the cavity is covered by the end plate to secure the magnet in the cavity independently upon the orientation of the end plate around the centre axis.

2. The rotor according to claim 1, wherein the first portion constitutes at least 50 percent of the cross sectional area of the opening into the cavity.

3. The rotor according to claim 1, wherein the end plate has a circular outer peripheral rim.

4. The rotor according to claim 1, further comprising a squirrel cage with axially opposite short circuit rings, and wherein the end plate has a smaller radial size than the radial size of the short circuit ring and a shape which matches an inner surface of the short circuit ring.

5. The rotor according to claim 1, wherein the second area is equal to, or larger than the first area.

6. The rotor according to claim 1, wherein the aperture is arch shaped.

7. The rotor according to claim 1, comprising a plurality of magnets and wherein the end plate comprises a plurality of apertures.

8. The rotor according to claim 6, wherein the arch-shaped aperture(s) define(s) an arched radial outer peripheral edge and an arched radial inner peripheral edge, and wherein one of the magnets is secured in the cavity by the inner peripheral edge, and an adjacent magnet is secured in the cavity by the outer peripheral edge.

9. The rotor according to claim 1, wherein the end plate is made from a magnetically conductive material.

10. The rotor according to claim 1, wherein the end plate is made from the same material as the rotor.

11. The rotor according to claim 1, wherein the end plate has a peripheral rim with a first rim portion and a second rim portion forming different radial distances to the centre axis.

12. A method of making a rotor comprising:
   a core made of a magnetically conductive material,
   a magnet located in a cavity in the core, the cavity having a first cross-sectional area and allowing insertion of the magnet into the cavity via an opening in an end face of the core, and
   an end plate which covers the end face, the end plate having an aperture with a second cross-sectional area
the method being characterised in that aperture is provided such that a first portion of the opening into the cavity is in communication with the aperture and such that a remaining, second, portion of the cavity is covered by the end plate to secure the magnet in the cavity independently upon the orientation of the end plate around the centre axis.

13. The method according to claim 12, wherein the aperture is provided at least in the size of the first cross-sectional area.

* * * * *